April 20, 1937.   K. E. BEMIS   2,078,189
PIE CRUST FORMING, TRIMMING, AND BAKING MACHINE
Filed Feb. 7, 1936   2 Sheets-Sheet 1

INVENTOR.

April 20, 1937.　　　K. E. BEMIS　　　2,078,189

PIE CRUST FORMING, TRIMMING, AND BAKING MACHINE

Filed Feb. 7, 1936　　　2 Sheets-Sheet 2

INVENTOR.

Patented Apr. 20, 1937

2,078,189

UNITED STATES PATENT OFFICE 2,078,189

PIE CRUST FORMING, TRIMMING, AND BAKING MACHINE

Kenneth E. Bemis, Oakland, Calif.

Application February 7, 1936, Serial No. 62,827

6 Claims. (Cl. 107—66)

This invention, a pie-crust forming, trimming, and baking machine, is particularly designed for carrying out a new process of making pies, in which pies of any and all kinds can be quickly assembled and delivered at the time the order is received, and which includes covered or double-crust pies, such as fruit pies, uncovered pies, such as cream, lemon and pumpkin, and, meat pies which require only a top crust.

In all methods of making pies, as now practiced, an assortment of pies is baked complete, anticipatory of the demand for definite kinds and flavors, which usually results in an oversupply of some kinds and an undersupply of other kinds.

Fruit pies are under present methods made up by placing the fruit in an unbaked shell and placing and sealing an unbaked top crust thereover and baking the assembly.

Lemon, cream, and similar pies are made by pre-baking a shell or bottom crust, placing the filler in the shell, and again baking to cook the filler or brown the topping.

Meat pies are made by placing the filler in a metal or earthenware or similar container, placing and sealing an unbaked top crust thereover and baking the assembly.

This invention features a means whereby the process of co-pending application, Serial number 62,828 filed Feb. 7, 1936, may be carried out, and by which the product thereof may be produced.

This invention produces a shell or bottom crust, and a top crust, both of which have distinct advantages and present new features in the art of making pies of different kinds, and consists of a prebaked shell, which is provided with an annular recess of predetermined depth, the bottom of which forms a top-crust supporting ledge, and the circumferential wall of which forms a matching shoulder for the top crust, the shell terminating in a finishing flange provided with suitable ridges or indents, and being of single-crust thickness.

The top crust is made with a peripheral thickness exactly matching the depth of the recess in the shell, and of the same diameter, so that when the top crust is placed in position, the top crust forms an unbroken surface with the encompassing finishing flange, provided the appearance of a continuous top crust coextensive with the shell.

The same means which retains the top crust in position selectively functions as a limit line for topping for open pies, and the specific form and structure of the crusts produces an illusory effect, since it extends beyond the filler about double the distance as related to the usual product.

In addition, the assembled covered pies appear almost identical to a covered pie baked in the usual manner, but all pies made according to this process are identical as to form, size and color, and obviate the double-crust edge.

The shell or bottom crust may be used alone for uncovered pies, and the top crusts may be used with an inedible container, such as metal, vitreous, or paper, for meat and similar pies.

These crusts may be stored for a long period and will remain fresh and crisp, due to the new and unusual process, which produces a flaky, crisp crust, having the necessary strength and stability to withstand ordinary handling, and shipment, when suitably packed.

The objects and advantages of the invention are as follows:

First; to provide a machine for baking pie crusts to definite and predetermined form and size for interchangeability, and which crusts will fit together perfectly, and which may be assembled at will in any style or with any kind of pie filling, whereby the demand for any kind of pie may be met immediately at the time an order is received.

Second; to provide a machine as outlined which in one operation will form, flute, pierce, trim and bake pie crusts to exact dimensions and form.

Third; to provide a machine as outlined which will form a fluted edge on the shell or bottom crust, and coincidently form an annular recess for close reception and support of a top crust, with the recess having a depth exactly equal to the thickness of the top crust at its peripheral edge, whereby the top crust will form an unbroken continuation with the fluted edge to provide the appearance of a coextensive top crust.

Fourth; to provide means for severing the trimmings at the conclusion of the trimming operation to permit the trimmings to free themselves from the body of the machine, and also to flare the bodies or pedestals to assist in this freeing operation.

Other objects and advantages of the invention will become apparent as the following description is read on the drawings forming a part of this specification, and in which similar reference characters are used to designate similar parts throughout the several views, of which;

Figure 1:
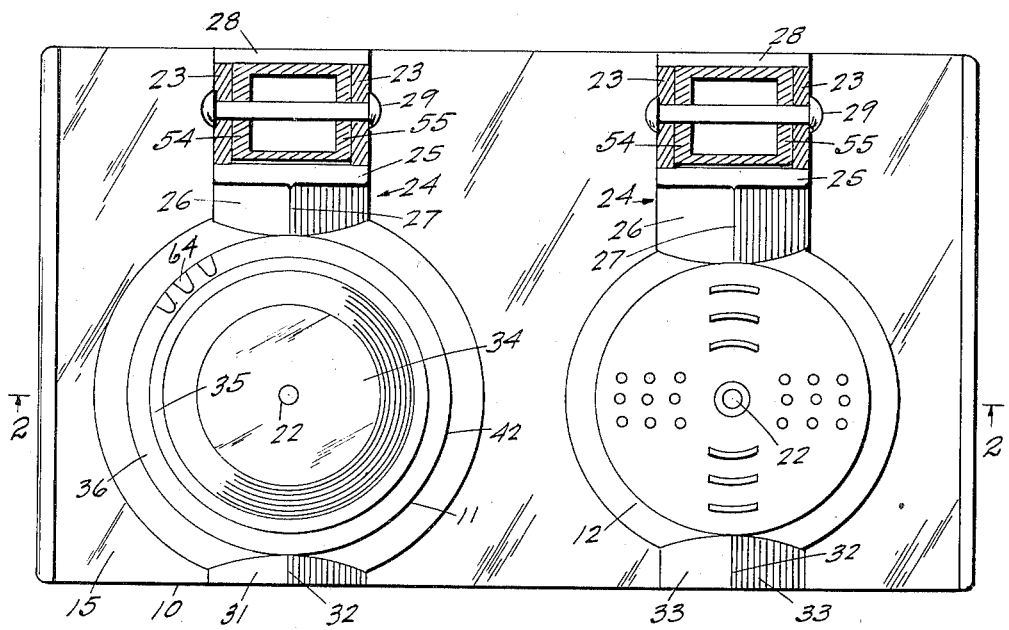
Fig. 1 is a plan view of the lower portion of the invention, and showing only the hinge portion of the head or upper portion, in section.
Figure 2:
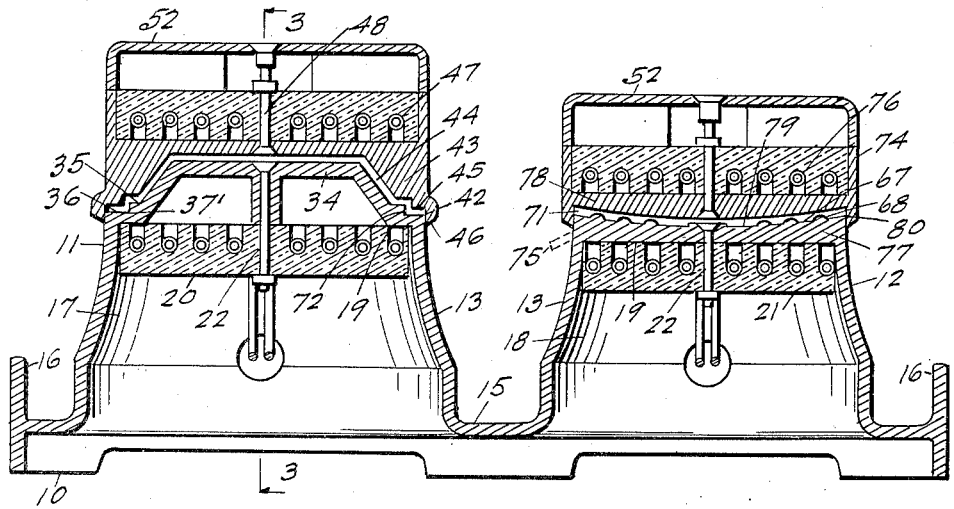
Fig. 2 is a sectional elevation through the entire machine, and taken on line 2—2 of Fig. 1.
Figure 3:
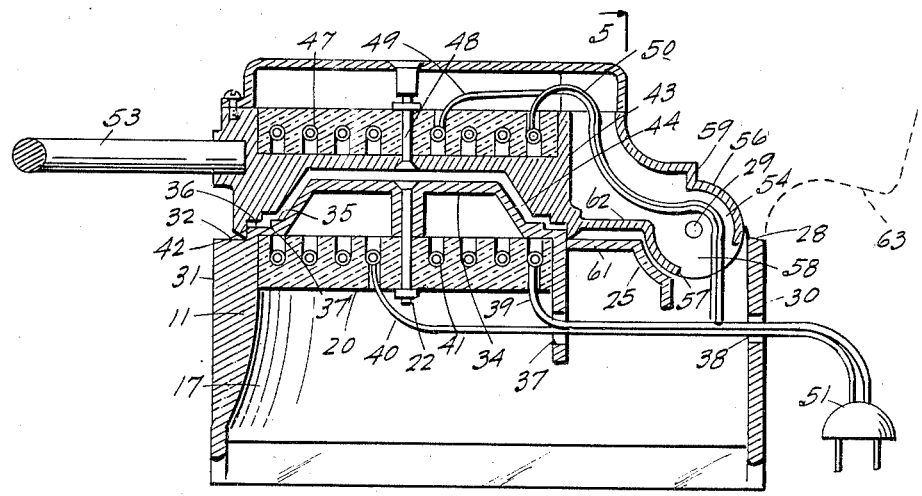
Fig. 3 is a section taken on line 3—3 of Fig. 2.

The invention consists primarily of two units, which units are interdependent, since top and bottom crusts, for best results, should be baked from the same batch of dough, having the same moisture content, and same material proportions. One of these units completes shells, and the other completes top crusts. The results thereby, are decisively accurate.

Each unit performs all operations, including forming of the rolled dough to shape, fluting edges, recessing, piercing or indenting, trimming, severing and disposing of the trimmings, and baking both sides of the crust simultaneously in a confined chamber having the exact form and dimensions of the finished crust.

The operations on shells or bottom crusts, and on top crusts are identical, except as to form, which obviously differs.

The lower member consists of a base 10 which is provided with two integral pedestal members 11 and 12, which are flared downwardly toward the base as indicated at 13, to spread and free the trimmings 14 to cause them to slide or drop downwardly and be deposited on the top surface 15 of the base, forming trimmings disposal means, and suitable retaining walls 16 are provided for retaining the trimmings for convenient removal.

The lower members are each formed hollow internally as shown at 17 and 18, and have each a seat 19 for the heating units 20 and 21, which are secured in position by any known means, such as bolts 22.

Integral with each base member is a hinge portion, consisting of the ears 23, and a connecting member 24, consisting of a guard portion 25 and a trimmings-severing portion 26, connects the hinge ears 23 with the respective main body portions 11 and 12. The severing portion has a cutting edge 27 at the top, which cuts the trimmings in two.

A stop for the raised position of the upper or head section may be of any suitable type, and is shown as consisting of a shoulder 28 extending back from the ears 23, and having its top surface inclined from the axis of the pivot 29, this shoulder being formed at the top of the wall 30.

A second trimming member 31 having a cutting edge 32, is located at the front of each body portion 11 and 12. Both trimmings-severing members have inclined side faces 33, to straighten the trimmings and more readily release them from the body portions.

The shell forming and baking means consists of a male element 34, which is frusto-conical in form, the base thereof terminating in an annular shoulder and recess forming element 35, which in turn terminates in an annular flange forming element 36, which may be provided with suitable undulations, serrations, or other patterns, the edge 37' of the flange forming element being formed with a sharp or square corner, for purposes described in connection with the top crust.

This male element may be formed integral with the main body portion, or may be formed as a separate unit and removably secured to the main body portion.

Suitable passages 37 and 38 are provided for the current-carrying conductors 39 and 40 which are connected to the terminals of the heating element 41.

The flange forming element terminates in an annular shear edge 42.

The head or upper member consists of a female element 43, which spacedly coincides with the male element, with the space 44 coinciding with the form and dimensions of the baked crust as desired. The flange portion 45 of this element terminates in a depending annular shear edge 46, which cooperates with the shear edge 42 to trim the edge of the dough after the disc of dough has been formed.

A heating element 47 is secured in position over the female element by known means, such as a bolt 48. This heating element has its terminals connected to a source of current through the conductors 49 and 50, which are connected in parallel with conductors 39 and 40, to a suitable plug 51.

A cap 52 is secured over the top of each unit, and may be packed with thermal insulation, and may also be used to house thermostats and other control and indicating apparatus, (not shown). The hollow bases below the heating elements 20 and 21 may be similarly utilized.

A handle 53 is fixed in the front of the head or is formed integrally therewith, for manual opening and closing of the machine, and a hinge portion, consisting of ears 54 and 55 with intervening walls 56 and 57, form a closure for the conductor passage 58. The wall 56 has a step or shoulder 59 formed therein, for cooperation with the shoulder 28 in open position of the head.

The edges 32 may be used to limit the closure in cooperation with the edge 60 of the head, or other stop means may be provided, such as a pin or screw (not shown) adjustably fixed in the wall 61 or 62 of the hinge members.

With the head in open position, (indicated at 63), a disc of rolled dough need merely be laid over the male element 34 and the head lowered to close, allowing the head to close and finally come to rest through the action of gravity.

This action first forms the dough about the frusto-conical surface, over the recess portion 35, into the sharp corner 37, and over the flange portion 36, forming undulations or other ornamental rim effects as may be provided in the surface 36, such as is shown at 64; finally trimming the edge of the blank and severing the trimming at 27 and 32, the head coming to rest in predetermined spaced relation between the male and female elements, and the severed trimming spreads through cooperation with the inclined surfaces 33, dropping down onto the base.

Figure 6:
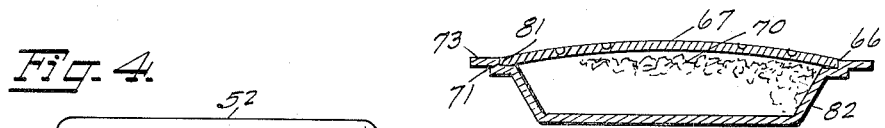
Fig. 6 is a section through an assembled pie, made according to the invention.
Figure 4:
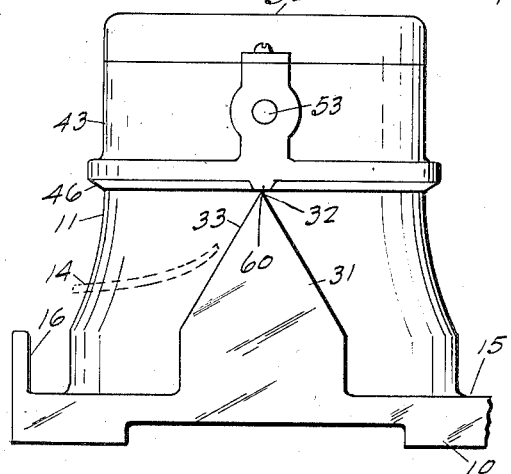
Fig. 4 is a front elevation of the shell-baking unit.
Figure 5:
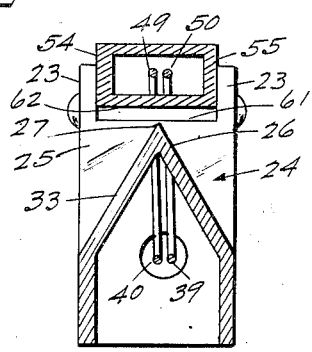
Fig. 5 is a section taken on line 5—5 of Fig. 3.
Figure 7:
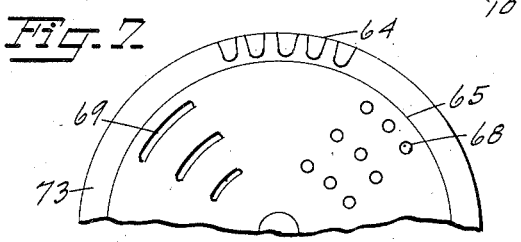
Fig. 7 is a fragmentary plan view of an assembled covered pie.

The heating units 20 and 47 provide the necessary heat to bake the crust to exact form and size, the dough first raising to fill every portion of the confined baking space 44, forming a sharp corner at 37, which corresponds to line 65, Fig. 7, and point 66, Fig. 6.

The top crust forming, piercing, trimming and baking means and trimmings severing means is identical to the forgoing except as to the form of the forming elements or dies employed. The top crust is formed with a convex top surface 67 provided with indents 68, 69, or perforations, the convex form maintaining the crust out of contact with the filler 70.

The diameter of the top crust is made almost identical to the diameter of the shell recess at point 37, being but a few thousandths of an inch less, and the thickness at edges 71 is made identical to the depth of the recess 72, whereby, when the top crust is assembled with a shell, the top crust will form an unbroken continuation with the surface of the flange portion of the shell, indicated at 73, but which flange portion consists of only a single thickness of crust, thereby differentiating from present types of pies.

The indents 68 and 69 are formed and the dough is convexly formed coincidently with closing of the head 74, which operation terminates by trimming the edge of the dough, the trimming 75 being severed by the edges 27 and 32, which severed trimming is straightened and spread by the sloping faces 33, and by the flaring side surfaces of the body, the heating elements 21 and 76 coincidently heating the respective female and male elements 77 and 78, which are stopped and retained in proper spaced relation as previously described, forming a confined baking chamber 79, which bakes the top crust accurately to diameter and thickness, and with a sharp edge at 80 for the purpose previously described.

When baked, the top crust fits snugly in the recess 81, exactly matching both as to height and diameter at point 66 or line 65.

When a pie of a certain kind is ordered, it can be quickly and conveniently assembled. For covered pies, a shell is filled with the particular filler, as ordered, and which is kept in sealed containers, and a top crust placed in position, resting on the ledge 81 and retained within the shoulder 71 of the recess.

For meat pies, a non-edible container having the same form and dimensions as the shell 82, is filled with the meat filler as ordered, and a top crust placed in position in the recess, while for open pies, the shell is filled with filler and the topping or meringue carried to the edge 65, this edge thus forming a shoulder and terminal indicator for the topping.

A particular advantage is gained by baking both crusts coincidently, since the dough for both crusts is then uniform, having the same moisture content and the same proportional ingredients, insuring accuracy and perfect fit. Therefore, the two units are interdependent and cooperative.

It will be understood that variations in the method, or in the construction and arrangement of parts, which variations are consistent with the appended claims, may be resorted to without detracting from the spirit or scope of the invention, or sacrificing any of the advantages thereof.

I claim:

1. A pie-crust machine, in combination, dough forming, trimming, and trimmings severing, means and heating means for said forming means.

2. A pie crust machine comprising a shell unit comprising two cooperatively related elements movable to open and closed positions and forming a confining baking chamber therebetween when in closed position, and operating during closing movement as forming and trimming means for dough, heating means associated with each of said elements; said unit being a shell with receptacle portion, flange portion, and intervening annular recess with a diameter adapted to snugly receive a top crust of preformed exact diameter, and a depth exactly equal to the peripheral thickness; trimmings severing means associated with said unit, and severed trimmings spreading and disposal means for said unit.

3. A pie crust machine comprising a base element having pie crust forming and baking means formed at the top thereof with peripheral dough-trimming edge, and a head element hinged to said base element and having pie crust forming and baking means formed in the under surface thereof and having an encompassing shearing element for cooperation with said dough-trimming edge for shearing dough to size and coincidently forming a completely confining baking chamber with said pie crust forming and baking means, and, diametrically located means on said base element forming trimmings-severing means for the dough trimmings.

4. A pie crust machine comprising a base element having pie crust forming and baking means formed at the top thereof with peripheral dough-trimming edge, and a head element hinged to said base element and having pie crust forming and baking means formed in the undersurface thereof and having an encompassing shearing element for cooperation with said dough-trimming edge for shearing rolled dough to size and coincidently forming a completely confining baking chamber in connection with said pie crust forming and baking means, and, diametrically located trimmings severing means on said base cooperatively related to said shearing element for severing the trimmings from said rolled dough, said trimmings severing means including means spreading the severed ends of said trimmings, and receiving means for said severed trimmings.

5. A pie crust machine comprising a base element including means for forming one side of a pie crust, and a peripheral dough-trimming edge, a head element hinged to said base element and including means for forming the other side of the pie crust, and having an encompassing shearing element shearing rolled dough to size and coincidently forming a completely confining baking chamber in combination with said means for forming the opposite sides of a pie crust, means on said base element cooperatively related to said shearing element for severing the trimmings of said rolled dough and coincidently forming stops for maintaining predetermined spacing between said means for forming the respective sides of said pie crust, in the closed position of said machine.

6. In a pie crust machine having cooperative dough forming, trimming, and baking means; Means severing trimmings during closing operation of said machine, and receiving means for said severed trimmings.

KENNETH E. BEMIS.